(12) United States Patent  
Van de Velde

(10) Patent No.: US 8,825,357 B2
(45) Date of Patent: Sep. 2, 2014

(54) NAVIGATION DEVICE AND METHOD

(75) Inventor: Tom Van de Velde, San Ramon, CA (US)

(73) Assignee: TomTom North America, Inc., Lebanon, NH (US)

( * ) Notice: Subject to any disclaimer, the term of this patent is extended or adjusted under 35 U.S.C. 154(b) by 43 days.

(21) Appl. No.: 13/318,838

(22) PCT Filed: Dec. 31, 2009

(86) PCT No.: PCT/US2009/069889
§ 371 (c)(1),
(2), (4) Date: Nov. 4, 2011

(87) PCT Pub. No.: WO2010/129000
PCT Pub. Date: Nov. 11, 2010

(65) Prior Publication Data
US 2012/0065873 A1    Mar. 15, 2012

Related U.S. Application Data

(60) Provisional application No. 61/215,239, filed on May 4, 2009.

(51) Int. Cl.
*G06F 19/00* (2011.01)
(52) U.S. Cl.
USPC ............................ 701/119; 340/905; 701/439

(58) Field of Classification Search
USPC ........ 701/119, 469, 439, 410, 408, 465, 532; 340/905
See application file for complete search history.

(56) References Cited

U.S. PATENT DOCUMENTS

| | | | |
|---|---|---|---|
| 6,317,686 B1 | 11/2001 | Ran | |
| 2002/0120389 A1 | 8/2002 | Fushiki et al. | |
| 2007/0208501 A1* | 9/2007 | Downs et al. | 701/119 |
| 2008/0004789 A1 | 1/2008 | Horvitz et al. | |
| 2008/0071465 A1 | 3/2008 | Chapman et al. | |
| 2008/0269985 A1 | 10/2008 | Yamada | |
| 2008/0294302 A1 | 11/2008 | Basir | |

OTHER PUBLICATIONS

International Search Report issued Mar. 2, 2010 for International Application No. PCT/US09/69889.

* cited by examiner

*Primary Examiner* — Thomas Black
*Assistant Examiner* — Luke Huynh

(57) ABSTRACT

Some embodiments provide a method of determining speed information for one or more road segments in map data by receiving probe data relating to the one or more road segments, determining a speed formula for the one or more road segments based on the probe data, and determining the speed information for the one or more road segments according to the speed formula.

17 Claims, 6 Drawing Sheets

NAVIGATION DEVICE AND METHOD

This application is the National Stage of International Application No. PCT/US09/69889, filed Dec. 31, 2009 and designating the United States. The entire contents of this application is incorporated herein by reference.

This application claims priority from U.S. Provisional Application No. 61/215,239, filed on May 4, 2009. The entire contents of this application is incorporated herein by reference.

FIELD OF THE INVENTION

This invention relates to navigation devices and to methods for determining speed information for navigation devices. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

As noted above, navigation devices are generally configured to compute a route between two or more locations based on map data. As part of the route calculation process a part of the map data referred to is speed information associated with one or more road segments in the map data. Based on the speed information the route may be determined according to one or more criteria. Typically the speed information is attributed to each of the one or more road segments according to one or more characteristics associated with those road segments. For example, in the United Kingdom, road segments representing three-lane motorways may have associated average speed information indicating that an average speed of travel on those road segments is 65 mph. Similarly, road segments representing dual carriage ways may have associated average speed information of 60 mph. However, speed information associated with road segments is not necessarily accurate. For example, two road segments having the same associated speed information may, in reality, have different average speeds. Furthermore, storing speed information associated with a plurality of road segments in the map data may require a considerable storage space.

It is an aim of some embodiments of the present invention to improve an accuracy of speed information associated with one or more road segments. It is an aim of some embodiments of the invention to reduce storage space requirements for map data.

SUMMARY OF THE INVENTION

In pursuit of this aim, a presently preferred embodiment of the present invention provides: a method of determining speed information for one or more road segments in map data, comprising: receiving probe data relating to the one or more road segments; determining a speed formula for the one or more road segments based on the probe data; and determining the speed information for the one or more road segments according to the speed formula.

A further preferred embodiment of the invention provides a navigation device comprising a speed determination module arranged to determine speed information for one or more road segments in map data according to a speed formula.

Another embodiment of the invention provides a system comprising a server arranged to receive probe data; a navigation device comprising a speed determination module arranged to determine speed information for one or more road segments in map data according to a speed formula wherein the server is configured to determine the speed formula for one or road segments based on the probe data and to communicate the determined speed formula to the navigation device; and the speed determination module of the navigation device is arranged to determine the speed information using the speed formula.

Yet another embodiment of the present invention relates to computer software comprising one or more software modules operable, when executed in an execution environment, to cause a processor to receiving probe data relating to the one or more road segments; determining a speed formula for the one or more road segments based on the probe data; and determining the speed information for the one or more road segments according to the speed formula.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
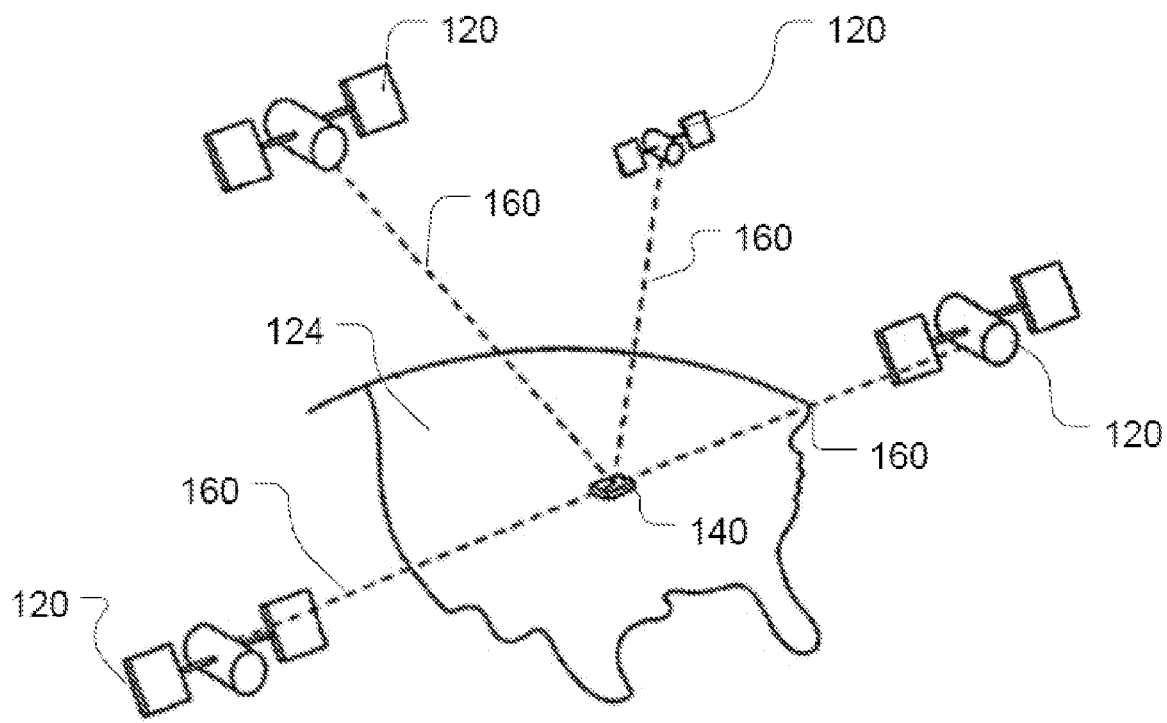
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
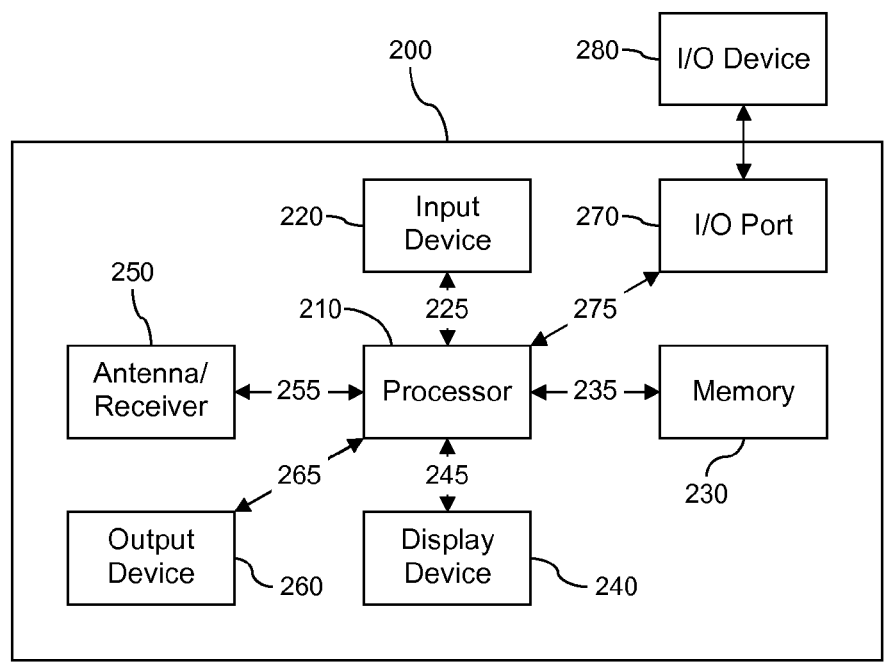
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245 and 265, respectively, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
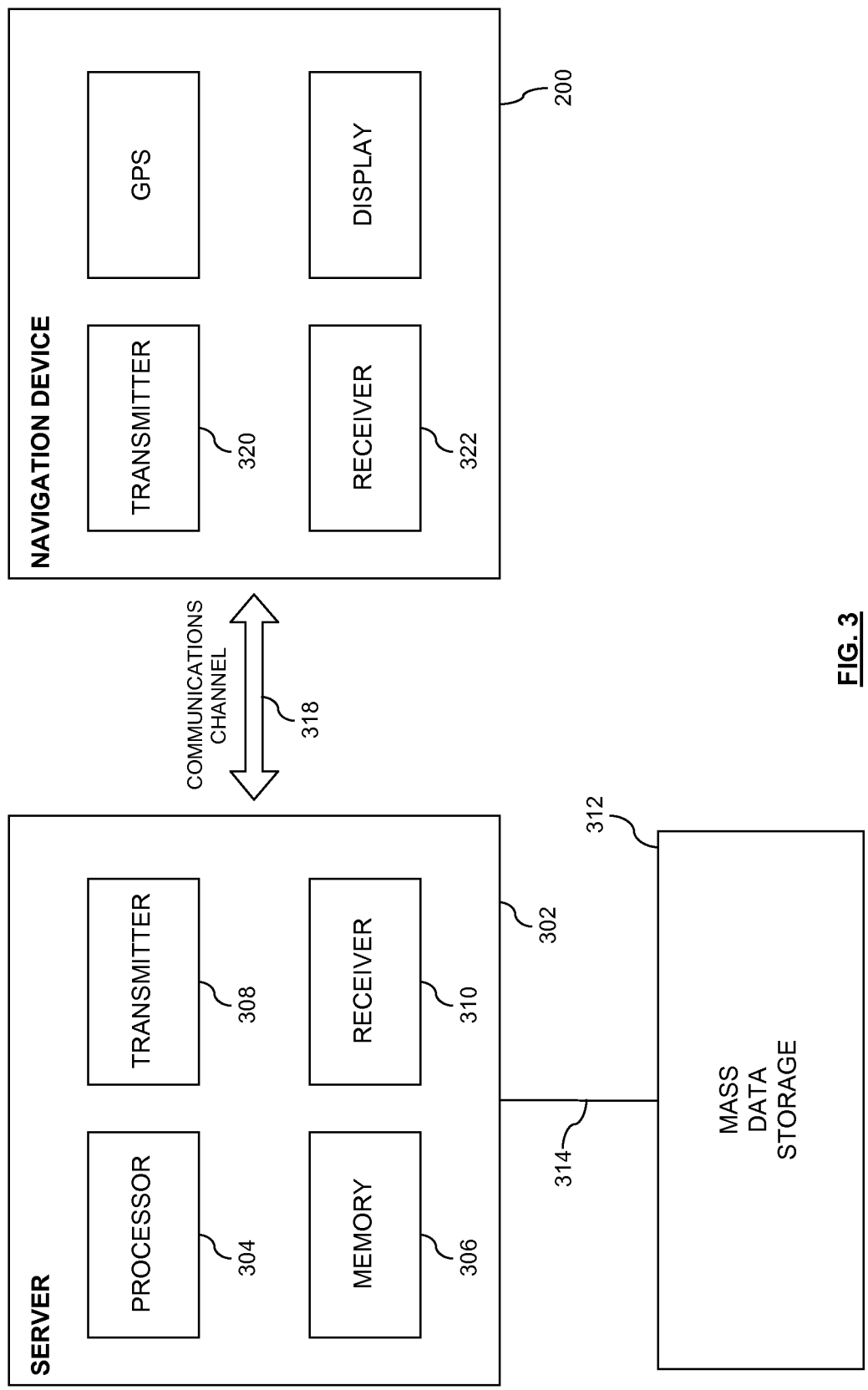
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
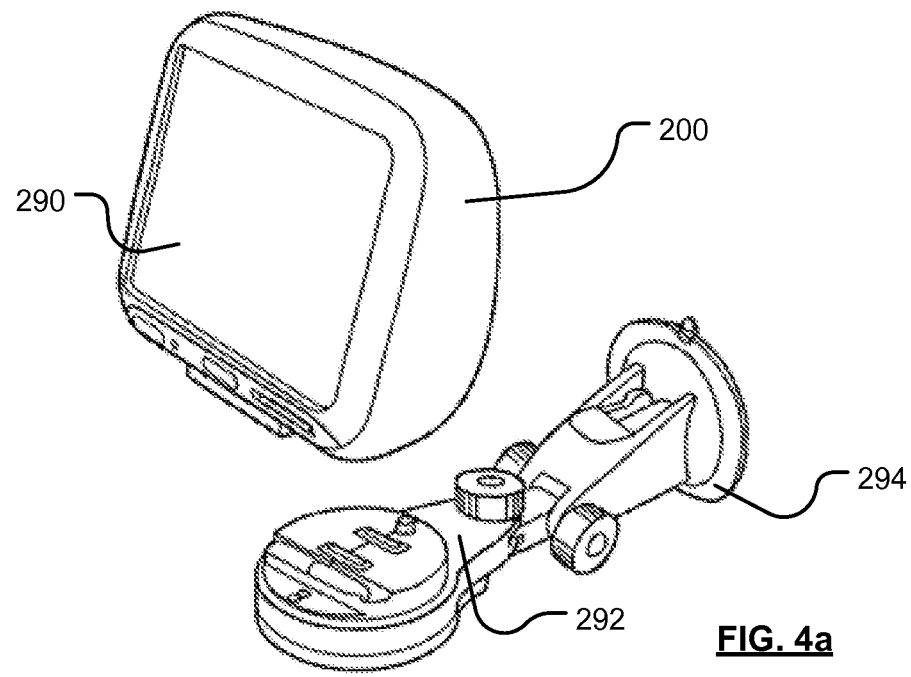
FIGS. 4A and 4B are illustrative perspective views of a navigation device.
Figure 4B:
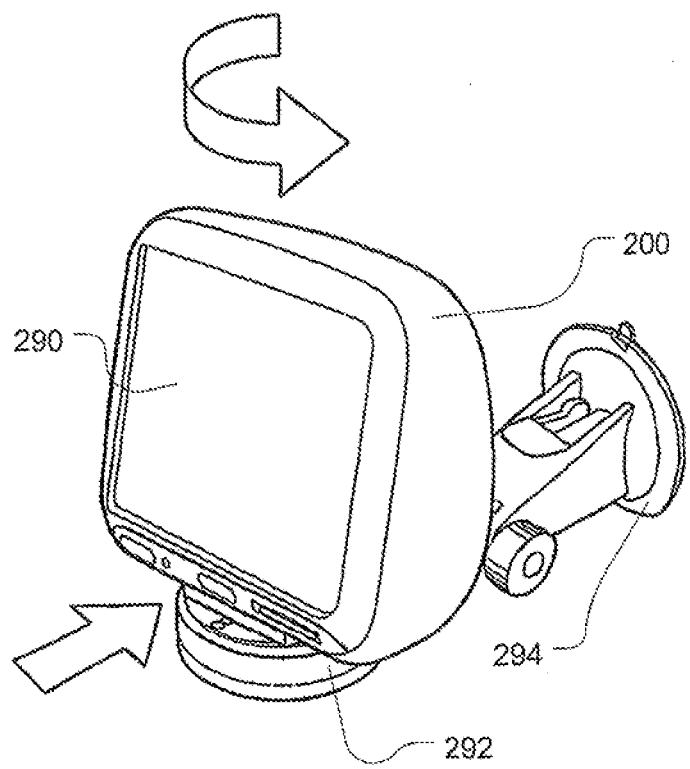

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
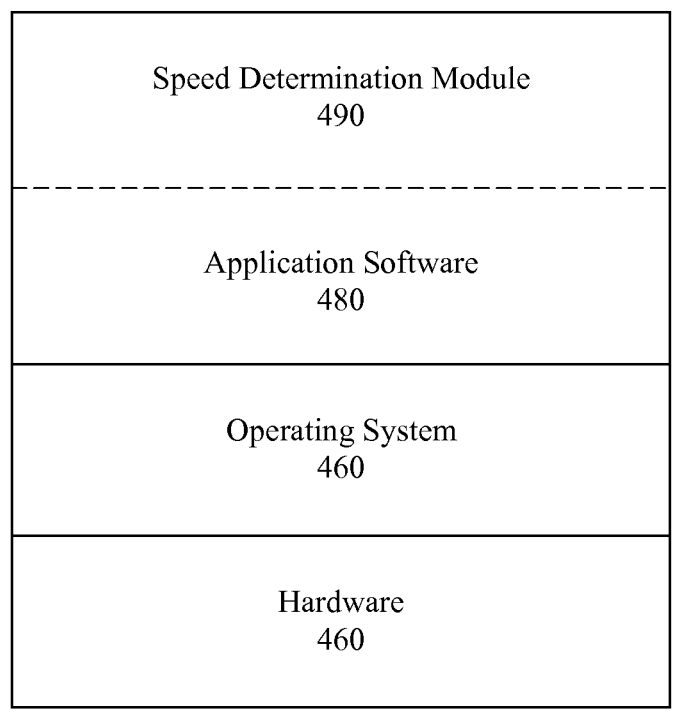
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith.

In accordance with a first embodiment of the present invention, part of this functionality comprises a speed determination (SD) module 490, the function of which will now be described in detail in connection with the following figures.

In the first embodiment of the present invention, the speed determination module 490 is configured to determine speed information associated with at least one road segment in the map data. The speed information is determined by the SD module 490 according to one or more attributes associated with the road segment. The speed determination module 490 is arranged to determine the speed information for the road segment using an equation which uses attributes of the road segment as independent variables. The speed information determined by the equation may be an average speed of the road segment i.e. an expected average speed for a vehicle to traverse the road segment. The first embodiment of the invention will now be explained in more detail.

Figure 6:
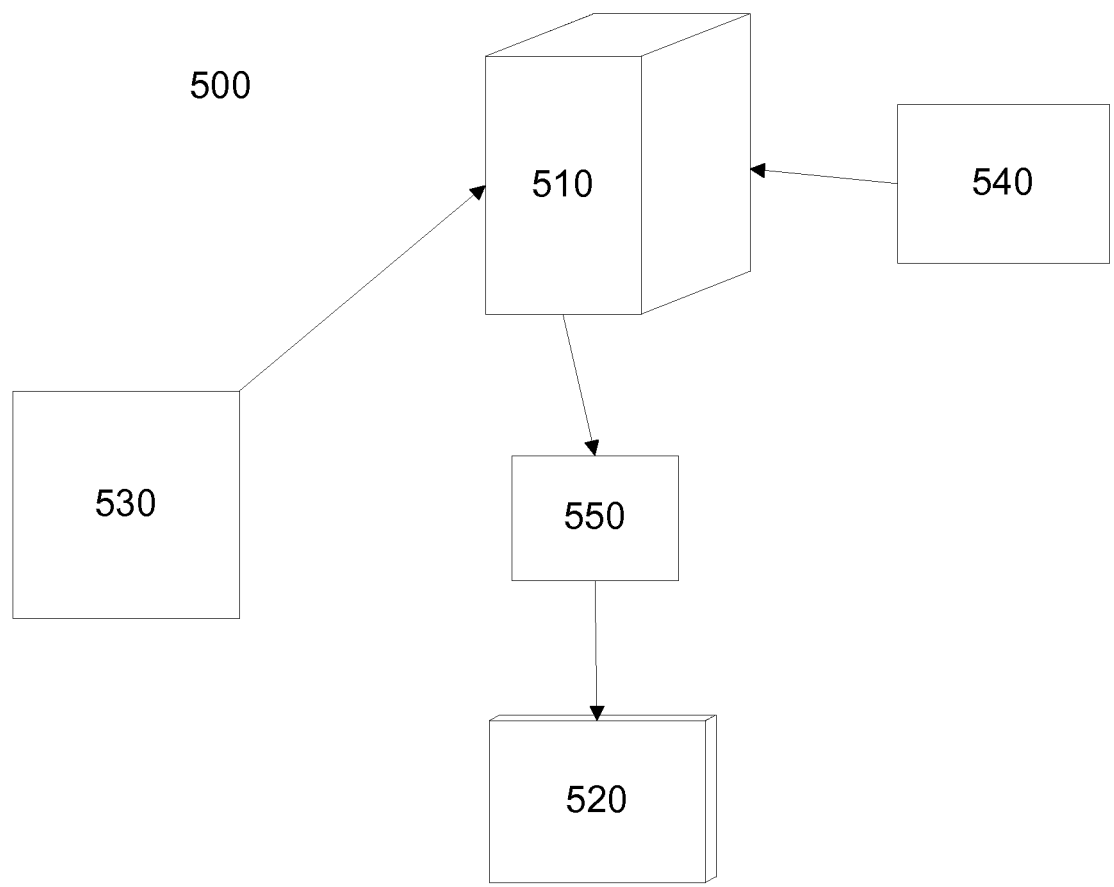
FIG. 6 is a diagram of a system according to an embodiment of the invention.

Referring to FIG. 6, a system 500 according to an embodiment of the invention is shown. The system comprises a server 510 in, at least periodic, communication with a navigation device 520. The server 510 is arranged to receive probe data from one or more sources. The probe data 530 may be received from one or more mapping vehicles (not shown). A mapping vehicle is a vehicle equipped with various types of sensors and location determination equipment, typically derived from received GPS signals, which is arranged to travel around a road network to capture and store information about the road network. Typically, the mapping vehicle stores location information at predetermined intervals around the road network e.g. every 25 meters, although it will be realised that other distance or time intervals may be selected. Furthermore, time information may also be stored which is associated with the location information, such that a speed of travel of the mapping vehicle around the road network may be determined. The mapping vehicle may also store other information, such as video and/or still images around the road network from which road markings, signs and other information may be determined. Alternatively, or additionally, the probe data 530 may be received from one or more navigation devices 200 which travel about the road network i.e. during "free driving" or whilst providing route guidance to a user, as previously explained. Such navigation devices 200 may store, at least temporarily prior to communication, or communicate probe data 530 in the form of journey information indicating journeys made by the navigation device 200. The probe data 530 may include location information of the navigation device 200 at predetermined time intervals or a location of the navigation device 200 at predetermine distance information and associated time information, such that a speed of the navigation device 200 along a road segment may be determined from the probe data 530. It will be realised that the probe data 530 may include a combination of data from one or mapping vehicles and navigation devices, and also from one or more additional sources.

The server 510 includes a speed formula determination (SFD) module 540. The SFD module 540 is configured to operatively determine a speed formula for one or more road segments from the received probe data 530. The determined speed formula allows a speed of travel on the road segment to be determined from attributes associated with the road segment. Ideally, in order to reduce the data storage requirements of the map data by reducing the amount of speed information associated with road segments in the map data, the speed formula determined by the SFD module 540 is applicable to a plurality of road segments in the map data. That is, the speed formula is applicable determining speed information for a plurality of road segments, such that the data storage requirements of the map data are reduced. The speed information determined by the speed formula 550 is, in some embodiments, an average speed of travel along each road segment.

In some embodiments, the SFD module 540 is configured to determine an average speed along a plurality of road segments using a polynomial equation of the form:

$$\text{AvgSpeed} = a + b_1 x_1 + b_2 x_2 + \ldots b_p x_p$$

where a is a constant, $b_1$ to $b_p$ are weighting factors and $x_1$ to $x_p$ are independent variables associated with the road segments. For example, $x_1$ may represent a number of lanes of the road segment and $x_2$ may represent a classification of the road segment.

Figure 7:
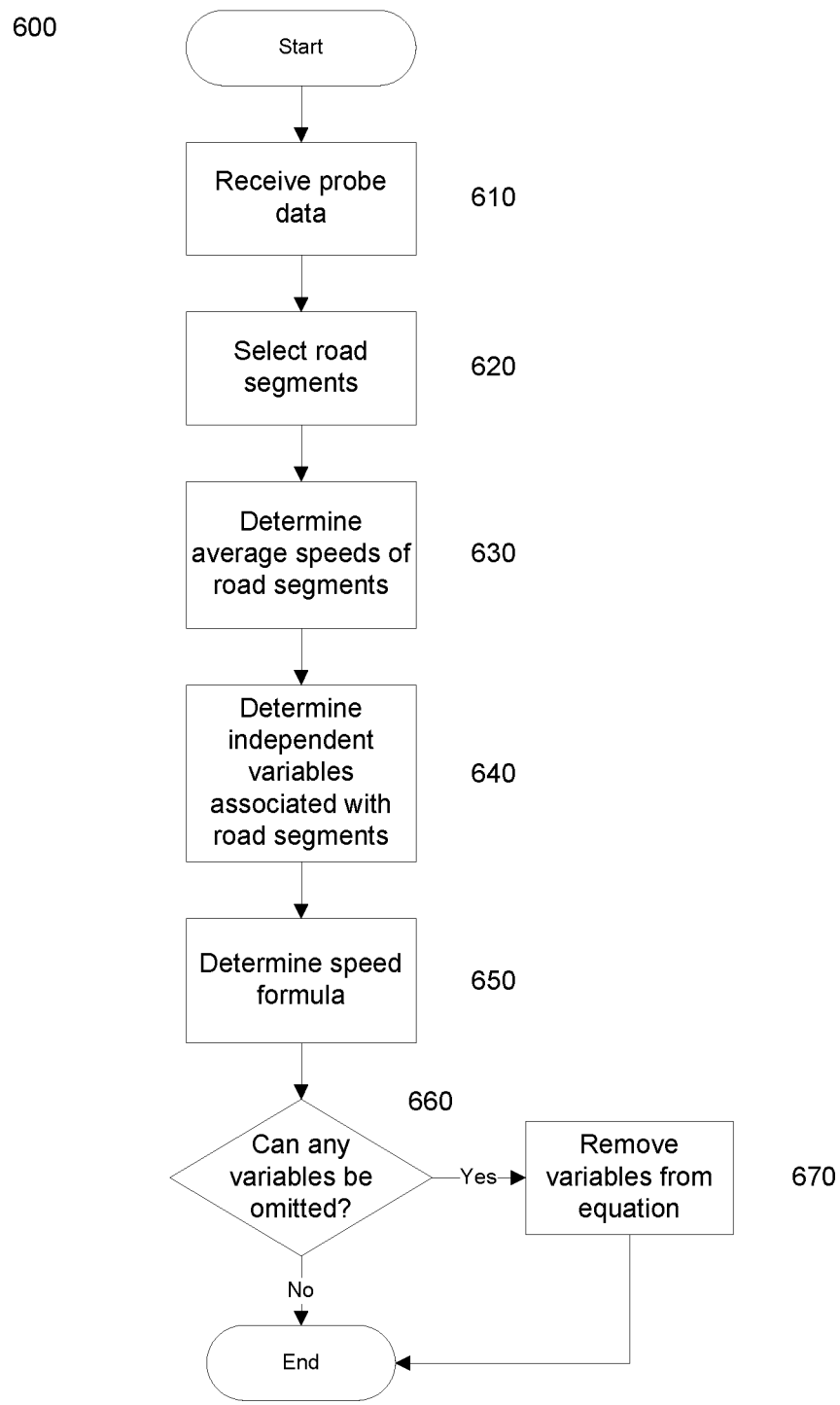
FIG. 7 is a flow chart illustrating a method according to an embodiment of the invention.

FIG. 7 illustrates a method 700 performed by the SFD module 540.

In step 610 the probe data 530 is received, as described above.

In step 620 one or more road segments are selected for which a speed formula is to be determined by the SFD module 540. Step 620 may be omitted where the speed formula is to be determined for all road segments for which the probe data 530 has been received. However, in some embodiments, the speed formula may be determined for only some selected road segments for which the probe data has been obtained.

In step 630 an average speed for each selected road segment is determined by the SFD module 540. In embodiments where the probe data 530 already contains an average speed of each road segment then step 630 may be omitted. However, in some embodiments, the average speed of each selected road segment must be derived from the probe data 530. For example, where the probe data contains a series of sequential location measurements at predetermined time intervals, the SFD module 540 determines the average speed for all vehicles providing probe data for each road segment of the selected road segments.

In step 640 the SFD module 540 is configured to determine the independent variables associated with the selected road segments. In some embodiments, the independent variables are those variables associated with all of the road segments. For example, if one or more of the selected road segments has a particular associated variable, whilst others of the selected road segments do not share that variable, then that variable is removed from consideration in step 640. As a result of 640, a plurality of independent variables are determined which are shared by all of the selected road segments. The independent variables may include variables indicative of a number of lanes of the road segment, a type of pavement alongside the road segment (if any), a classification of the road segment i.e. road type, whether the road segment has access i.e. entrances and exits (some segments e.g. those of a major highway or motorway may not have any entrances i.e. the segment may not extend as far as an on-ramp or slip-road entrance/exit), a type of vehicle permitted on the road segment, an administrative region in which the road segment is located e.g. a state in which the road segment is located (for example a maximum speed limit in Arizona is 10 mph higher than that in Massachusetts), and whether the road segment is through a rural or urban area. It will be realised that this list of variables associated with road segments is not exhaustive and that other or alternative variables may be considered. In step 640 it should be considered whether the variables are truly independent of one another. For example, in some map databases, a plurality of types of road classifications are utilised to group road segments having similar characteristics. These road classifications may take into account various factors or characteristics of each road segment. However, the characteristics of road segments in each group may partly overlap, such that the classifications are not truly independent.

In step 650 the speed formula for the road segments is determined according to the variables selected in step 640. Multiple regression analysis may be utilised in step 650 to determine the speed equation. A plurality of different combinations of the independent variables determined in step 640 may be used and a residual variance of each combination compared to determine the speed formula having a smallest error with the average speeds determined in step 630. Step 650 may be performed by further selecting some or all of the variables selected in step 640 and applying them to the equation on which the speed formula is based, which may be of the form:

$$AvgSpeed = a + b_1 x_1 + b_2 x_2 + \ldots b_p x_p$$

In a first iteration of step 650, all of the variables selected in 640 may be incorporated into the equation and values of a and $b_1$ to $b_p$ determined which provide a minimum residual variance or R-squared value. In one or more further iterations of step 650, one or more of the variables may be omitted from the equation to determine whether an equation may be found having a lower residual variance or R-squared value than the equation incorporating all of the variables selected in step 640. As a result of step 650 an average speed formula is determined which includes some or all of the independent variables selected in step 640 and a and $b_1$ to $b_p$ determined to produce the lowest residual variance or R-squared value. In other embodiments, step 650 may utilise cluster analysis, non-linear forms of regression or use of multivariate statistical models to determine the speed formula based on the selected variables.

In step 660 one or more further techniques may be utilised to determine whether it is possible to reduce a number of terms in the speed formula determined in step 650 which have a relatively low influence on the accuracy of the speed formula. For example if a term $b_p x_p$ may be eliminated which reduces the accuracy of the speed formula by less than a predetermined amount, then this term is eliminated or removed from the speed formula in step 670. The predetermined amount may be, for example, a difference of 0.5, 1 or 2 $kmh^{-1}$ from the average speed determined in step 630, although it will be realised that other values may be selected. The terms to be removed from the speed formula may be determined as a result of principal component analysis.

As a result of the method 600, a speed formula is determined which allows an average speed of a plurality of road segments to be determined from attributes associated with those road segments.

Following the determination of the speed formula 550, it may be communicated to one or more navigation devices as shown in FIG. 6. The speed formula 550 may be communicated wirelessly to the navigation device 520, or whilst the navigation device 520 is connected to a host computer which is in communication with the server 510 e.g. via the Internet. In some embodiments, the speed formula 550 is associated with information identifying for which road segments it may be used to determine the average speed. The navigation device 520 may receive more than one speed formula 550 from the server 510 along with respective indications of road segments for which each speed formula may be used to determine the average speed. Advantageously, this allows more accurate calculation of average speeds where one formula applied to a larger number of road segments would be less accurate, whilst still reducing the data storage requirements of the map data.

Once one or more speed formulas have been received by the navigation device 520, the SD module 490 may utilise the speed formula for a road segment to determine the average speed of traversing that road segment. The average speed may be determined when required, for example during route calculation. Thus the size of the map data stored in the memory 230 of the navigation device 520 may be reduced.

In other embodiments of the invention, the one or more speed formulas determined by the server 510 are communicated to a map data provider (not shown). The map data provider uses the one or more speed formulas to determine an average speed of one or more road segments in the map data, which is later communicated to one or more navigation devices 200. For example, the map data containing road segments having an associated average speed determined using one of the speed formulas is incorporated in new navigation devices 200 or is provided to existing navigation devices as updated map data. Although in these embodiments the data storage requirements of the map data are not reduced, the average speeds in the map data which have been determined using the speed formula are more accurate through being based on received probe data.

In other embodiments, the one or more speed formulas may be utilised by the server 510 to determine an average speed for a road segment upon request from the navigation device 520. For example, the navigation device 520 may communicate a message to the server 510 which requests speed information for a particular road segment. The server 510, in response to receiving the message, uses the speed formula applicable to the identified road segment and returns a response message to the navigation device 520 indicating the calculated average speed for that road segment.

It will be apparent from the foregoing that the teachings of the present invention provide an arrangement whereby a formula may be determined which allows calculation of speed information for road segments, wherein the speed formula is determined from probe data. In this way, an accuracy of the speed information for the road segments may be improved. In some embodiments, at least one speed formula determined by an embodiment of the invention is stored in a navigation device for use by the processor of the navigation device to determine speed information for one or more road segments in map data stored in the navigation device. Advantageously, a storage requirement for the map data may be reduced. The speed information may be an average speed of one or more road segments.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of determining speed information for a plurality of road segments in map data, comprising:
   receiving probe data relating to one or more road segments;
   determining an average speed for each of the one or more road segments from the probe data;
   determining a speed formula for determining an expected average speed for each of the one or more road segments based on the determined average speed from the probe data and one or more independent variables associated with each of the one or more road segments; and
   determining the speed information for the plurality of road segments according to the determined speed formula.

2. The method of claim 1 further comprising reducing one or more terms in the speed formula based on an accuracy factor for the speed formula.

3. The method of claim 1, wherein the speed formula is determined by regression analysis.

4. The method of claim 1 further comprising associating the speed formula with information identifying which road segments of the one or more road segments the speed formula is used to determine the expected average speed.

5. The method of claim 1, comprising communicating the speed formula to one or more navigation devices, wherein the determining the speed information is performed by a processor of the navigation device.

6. The method of claim 1, comprising determining whether any terms may be eliminated from the speed formula without reducing an accuracy of the speed information by more than a predetermined amount.

7. The method of claim 1, wherein the probe data comprises a sequence of location measurements.

8. The method of claim 1 further comprising using a plurality of different combinations of the one or more independent variables associated with the one or more road segments and a residual variance of each combination compared to determine a speed formula having a smallest error with respect to the determined expected average speeds.

9. A navigation device comprising:
   a processor;
   a memory; and
   a speed determination module arranged to determine speed information for one or more road segments in map data according to a plurality of received speed formulas and attributes associated with the one or more road segments, the attributes comprising at least one of variables indicative of a number of lanes of the road segment, a type of pavement alongside the road segment, a classification of the road segment, road segment access information, vehicle type permissions, road segment locations by state, and road segment proximity to rural or urban areas.

10. The navigation device of claim 9, wherein the speed formula is a polynomial equation and one or more terms of the polynomial include attributes associated with the one or more road segments.

11. The navigation device of claim 9, comprising a communication means for receiving one or more speed formulas from a server.

12. The navigation device of claim 9, wherein the speed information is used to determine an average speed for each of the one or more road segments.

13. The navigation device of claim 9, wherein a received speed formula is to determine speed information for more than one road segment.

14. A system comprising:
   a server arranged to receive probe data;
   a navigation device according to claim 8;
   wherein the server is configured to determine the speed formula for determining an expected average speed for each of one or road segments based on the probe data and one or more independent variables associated with the one or more road segments and to communicate the determined speed formula to the navigation device; and
   the speed determination module of the navigation device is arranged to determine the speed information for a plurality of road segments using the speed formula.

15. The system of claim 14, wherein the server is arranged to receive the probe data from one or more navigation devices and/or a mapping vehicle.

16. The system of claim 14, wherein the server is arranged to determine the speed formula based on average speeds of traversing the one or more road segments according to the probe data.

17. A non-transitory computer program comprising computer readable code which, when executed by a computer, performs the method of determining speed information for a plurality of road segments in map data, comprising:
   receiving probe data relating to one or more road segments;
   determining an average speed for each of the one or more road segments from the probe data;
   determining a speed formula for determining an expected average speed for each of the one or more road segments based on the determined average speed from the probe data and one or more independent variables associated with each of the one or more road segments; and
   determining the speed information for the plurality of road segments according to the determined speed formula.

* * * * *